United States Patent [19]
Chen

[11] Patent Number: 5,960,361
[45] Date of Patent: Sep. 28, 1999

[54] METHOD AND APPARATUS FOR PERFORMING A FAST DOWNWARD MOVE IN A CELLULAR TELEPHONE FORWARD LINK POWER CONTROL SYSTEM

[75] Inventor: Tao Chen, San Diego, Calif.

[73] Assignee: Qualcomm Incorporated, San Diego, Calif.

[21] Appl. No.: 08/736,201

[22] Filed: Oct. 22, 1996

[51] Int. Cl.⁶ .................................................. H04B 7/26
[52] U.S. Cl. ........................................... 455/522; 455/69
[58] Field of Search .................................. 455/522, 126, 455/127, 69, 517, 524

[56] References Cited

U.S. PATENT DOCUMENTS

| | | | |
|---|---|---|---|
| 3,925,782 | 12/1975 | Anderl et al. | 343/178 |
| 4,112,257 | 9/1978 | Frost | 179/2 |
| 4,123,718 | 10/1978 | Lampert et al. | 325/474 |
| 4,193,031 | 3/1980 | Cooper et al. | 455/38 |
| 4,222,115 | 9/1980 | Cooper et al. | 375/1 |
| 4,225,976 | 9/1980 | Osborne et al. | 455/226 |
| 4,495,648 | 1/1985 | Giger | 455/73 |
| 4,580,262 | 4/1986 | Naylor et al. | 371/5 |
| 4,613,990 | 9/1986 | Halpern | 455/33 |
| 4,641,322 | 2/1987 | Hasegawa | 375/1 |
| 4,672,658 | 6/1987 | Kavehrad et al. | 379/63 |
| 4,765,753 | 8/1988 | Schmidt | 379/60 |
| 4,766,599 | 8/1988 | Miyazaki | 375/8 |
| 4,777,653 | 10/1988 | Bonnerot et al. | 455/69 |
| 4,811,421 | 3/1989 | Havel et al. | 455/69 |
| 4,868,795 | 9/1989 | McDavid et al. | 367/77 |
| 4,870,698 | 9/1989 | Katsuyama et al. | 455/67 |
| 4,901,307 | 2/1990 | Gilhousen et al. | 370/18 |
| 5,056,109 | 10/1991 | Gilhousen et al. | 375/1 |
| 5,077,742 | 12/1991 | Tsumura et al. | 371/32 |
| 5,093,840 | 3/1992 | Schilling | 375/1 |
| 5,220,678 | 6/1993 | Feei | 455/69 |
| 5,257,283 | 10/1993 | Gilhousen et al. | 375/1 |
| 5,450,616 | 9/1995 | Rom | 455/69 |
| 5,465,399 | 11/1995 | Oberholtzer | 455/69 |
| 5,504,773 | 4/1996 | Padovani | 375/200 |
| 5,574,983 | 11/1996 | Douzono et al. | 455/69 |
| 5,574,984 | 11/1996 | Reed et al. | 455/522 |
| 5,590,409 | 12/1996 | Sawahashi et al. | 455/522 |
| 5,594,946 | 1/1997 | Menich et al. | 455/522 |
| 5,604,766 | 2/1997 | Dohl et al. | 455/69 |

FOREIGN PATENT DOCUMENTS

| | | |
|---|---|---|
| 0212667 | 3/1987 | European Pat. Off. . |
| 0428099 | 5/1991 | European Pat. Off. . |
| 2281461 | 3/1995 | United Kingdom . |
| 9217011 | 2/1992 | WIPO . |
| 9631014 | 10/1996 | WIPO . |

Primary Examiner—Edward F. Urban
Attorney, Agent, or Firm—Russell B. Miller; Bruce W. Greenhaus; Tom Streeter

[57] ABSTRACT

A base station of the cellular telephone forward link power control system transmits frames initially at a high default transmit power level, then decreases the power level incrementally until either a frame erasure is detected, triggering an immediate sharp increase in transmission power, or until a predetermined period of time has elapsed, after which the base station performs a fast downward move in the transmit power level. The fast downward move constitutes a sharp reduction in the transmit power level. In one example, the fast downward move is performed if one hundred consecutive frames are successfully transmitted without a frame erasure. By providing the fast downward move in transmit power, the power transmitted is decreased on the average. In particular, the fast downward move allows the amount of transmit power to be reduced significantly in circumstances where slow incremental decreases in power would result in excess power being employed. Method and apparatus embodiments are disclosed.

13 Claims, 7 Drawing Sheets

METHOD AND APPARATUS FOR PERFORMING A FAST DOWNWARD MOVE IN A CELLULAR TELEPHONE FORWARD LINK POWER CONTROL SYSTEM

BACKGROUND OF THE INVENTION

I. Field of the Invention

The invention generally relates to cellular telephone systems and in particular to a Code Division Multiple Access (CDMA) cellular system employing a power control system for minimizing power usage within a forward link.

II. Description of the Related Art

The forward link of a cellular telephone transmission system between a base station and a mobile station is illustrated symbolically in FIG. 1. More specifically, FIG. 1 illustrates a base station 10 and a mobile station 12 with mobile station 12 moving relative to base station 10. Base station 10 transmits signals on a forward link 13 to mobile station 12. Mobile station 12 transmits signals on a reverse link 15 to base station 10.

The amount of power needed to reliably transmit signals from base station 10 to mobile station 12 is affected by various factors including the distance between mobile station 12 and base station 10, shadowing, fading, and interference from other sources such as other cellular base stations (not separately shown). In FIG. 1, factors producing shadowing, fading, or interference are generally represented as noise sources 14. As a result of these and other factors, the minimum amount of power required to reliably transmit signals from base station 10 to mobile station 12 can vary considerably and in a generally unpredictable manner as a function of time.

FIG. 2A provides an illustration of an exemplary minimum required power curve 16 as a function of time in arbitrary power units needed for reliably transmitting signals, perhaps in the form of frames, from base station 10 (FIG. 1) to mobile station 12 (also FIG. 1). As can be seen, the minimum amount of power required varies considerably with time. FIG. 2A also illustrates a constant transmit power level 17. The minimum required power 16 exceeds the transmit power 17 between points 18 and 19 resulting in signal loss likely causing a frame erasure wherein signals comprising an entire frame of transmitted data are discarded or otherwise ignored by mobile station 12. Ideally, a perfect feedback system would be provided between mobile station 12 (FIG. 1) and base station 10 for allowing base station 10 to always transmit signals to mobile station 12 at precisely the minimum necessary power level 16 (FIG. 2A) to thereby ensure that each transmitted signal is reliably received while also ensuring that the amount of power transmitted is minimized.

In a CDMA communication system, capacity of the system is maximized when the transmit power is minimized because transmissions to one user are seen as noise to all other users. An exemplary embodiment of a CDMA communication system is described in U.S. Pat. No. 4,901,307 entitled "Spread Spectrum Multiple Access Communication System Using Satellite or Terrestrial Repeaters" and in U.S. Pat. No. 5,103,459 entitled "System and Method for Generating Signal Waveforms in a CDMA Cellular Telephone System" both of which are assigned to the assignee of the present invention and are incorporated by reference herein.

As a practical matter, however, it is difficult or impossible to provide a perfect feedback system which would allow base station 10 to always transmit signals at the minimum necessary power level. Hence, either some amount of signal loss must be tolerated or some amount of power excess, or both, must be tolerated. For some cellular systems a maximum average signal loss of 1%, as measured by a frame error rate (FER), is considered acceptable. Only short periods of time with an FER above 1% are tolerated. One method for setting the power level such that a predetermined FER is achieved is by having mobile station 12 transmit back a message each time that it detects a frame erasure. In response to the frame erasure message base station 10 may, for example, increase its transmission power by 1 db. Such a system is described in detail in U.S. Pat. No. 5,056,109 entitled "Method and Apparatus for Controlling Transmission Power in a CDMA Cellular Telephone System", assigned to the assignee of the present invention and incorporated by reference herein.

FIG. 2B illustrates one exemplary power transmission feedback control technique. Within FIG. 2B, a minimum power requirement curve as a function of time is identified by reference numeral 20. A curve illustrating the actual power transmitted by base station 10 (FIG. 1) is identified by reference numeral 22. With the system of FIG. 2B, the amount of transmit power is initially set by base station 10 to a high default value 23. The transmit power is then successively, incrementally reduced by base station 10, perhaps on a frame by frame basis, until a point 25 wherein the power drops below the minimum power required resulting in a frame erasure. Mobile station 12 transmits a frame error message signal (shown in FIG. 1 as reverse link 15) to base station 10 indicating that one or more frame erasures have occurred and thereby indicating that the transmit power needs to be increased. Thereafter, base station 10 significantly increases the level or gain of transmit power 22 to ensure that subsequent frames of the transmitted signal are not also erased.

In FIG. 2B, for clarity and simplicity in illustrating the feedback concept, individual frames are not shown. Also, a feedback delay between the time when the transmit power falls below the minimum required power and the time when the transmit power is increased is shown as being minimal (as indicated by only brief periods of time when the transmitted signal level 22 falls below the minimum required signal level 20). In practical systems, this feedback delay time may be more significant. Also, in some practical systems the feedback signal provided to the base station indicates that the FER exceeds some predetermined maximum for some predetermined period of time rather than indicating that one or more frame erasures has occurred. In other systems, the feedback signal identifies only two or more consecutive frame erasures. Herein, unless otherwise noted, it is assumed that the feedback signal identifies that at least one frame erasure has occurred.

After the power has been significantly increased, base station 10 (FIG. 1) incrementally decreases the transmit power during time period 27 (FIG. 2B) until yet another frame erasure occurs at point 29 triggering yet another significant increase in the transmit power level. As can be seen, the actual transmit power 22 follows a generally saw-toothed pattern defined by sharp increases in transmit power followed by gradual successive decreases in transmit power. By decreasing the transmit power in this manner, the system can thereby transmit less power then would otherwise be required if the system continuously transmitted signals at the initial high default power level 23.

In addition, the ratio between the transmit power decrease and transmit power increase can be selected in accordance with the desired FER. For example, if a 1% FER is desired, then the ratio between the magnitude of the power decrease to the magnitude of the power increase should be roughly equal to 1/100.

Although the technique of FIG. 2B is effective in reducing the overall power transmission requirements, it is not entirely satisfactory. In particular, the combination of sharp increases in transmit power followed by slow incremental decreases in transmit power level results in a relatively high average transmit power level compared to the minimum average required power. This is seen most easily in circumstances where the minimum required power remains essentially constant as illustrated in FIG. 2C. More specifically, FIG. 2C illustrates a constant minimum required power level 24 and a resulting sawtooth power transmission pattern 26 occurring upon an application of the foregoing feedback technique.

The amount of excess transmit power is particularly significant in circumstances where the minimum required power level remains relatively low but includes occasional peaks of higher power requirements, caused perhaps as a result of movement of mobile station relative to buildings or the like. In FIG. 2D, such a power requirement curve is shown and is identified by reference numeral 30. The power requirement curve includes brief periods of higher power requirements 34 and 36. The resulting actual transmit curve is identified by reference 32. As can be seen, the amount of transmit power increases significantly during the brief periods of higher power requirements 34 and 36. Immediately following those periods, transmit power 32 decreases relatively slowly and incrementally over relative long periods of time 35 and 37, respectively, until eventually falling below the minimum required power level 30 and then being increased again. During the periods of time (35 and 37) following the increased power requirements, the amount of transmit power 32 remains significantly above the minimum required power level 30 resulting in a significant excess of transmit power.

In view of these disadvantages with the aforementioned feedback power control techniques, it would be desirable to provide an improved system which reduces the average power transmission requirements and, in particular, which reduces the surplusage of transmit power following brief peaks in minimum power requirements. It is to these ends that aspects of the present invention are drawn.

SUMMARY OF THE INVENTION

In accordance with the invention, a signal transmission power control system is provided with a means for transmitting signals initially at a pre-selected transmit power level; a means for successively, incrementally decreasing the transmit power level by a first amount; and a means for receiving a signal indicating that the transmit power level needs to be increased. The system also includes a means, responsive to receipt of the signals indicating that the transmit power level needs to be increased, for increasing the transmit power level and a means for decreasing the transmit power level by a second amount, greater than the first amount, following transmission of signals for a predetermined period of time without receipt of the signal indicating that the transmit power level needs to be increased. Hence, with this system, the transmit power level is incrementally decreased for some predetermined period of time. If no feedback signals indicating that the transmit power needs to be increased are received during that period of time, then the system decreases the transmit power by a greater amount to achieve an immediate, greater amount of power reduction. In other words, a two-tiered power reduction scheme is employed.

By providing the foregoing two-tiered power reduction scheme, the average power required is typically reduced over that of the sawtooth feedback technique described above, particularly in circumstances where the minimum power requirements remain relatively low but are interspersed with occasional peaks of higher power requirements. In such circumstances, the two-tiered technique can provide significantly greater average power reduction than the aforementioned sawtooth technique. Hereinafter, the second sharper drop in transmit power provided by this two-tiered technique is also referred to as a "fast downward move" in the sense that a drop or move to a lower power transmission level occurs faster than the incremental power reduction of the aforementioned sawtooth technique.

In one specific embodiment, the power control system of the invention is employed within the forward link transmission system of a cellular telephone system. In that embodiment, the power control system includes a means for transmitting data frames at a selected forward link transmit power level; a means for successively, incrementally decreasing the forward link power level by a first amount; a means for receiving a signal identifying whether a frame erasure occurred; a means for increasing the power level in response to receipt of the signal; and a means for decreasing the forward link power level by a second amount, greater than the first amount, following transmission of a predetermined number of consecutive frames without receipt of the signal indicating the frame erasure.

The principles of the invention may be employed in many types of power reduction feedback systems but the invention is particularly well suited for use in CDMA forward link power transmission systems configured in accordance with IS-95-A specifications wherein feedback is provided from a mobile station to a base station identifying whether previously transmitted signals were correctly received. In particular, the invention is well suited for IS-95-A "rate set 2" signal transmission rates wherein a power control bit or erasure indicator bit (EIB) is provided within each frame of a reverse link thereby allowing the base station to quickly detect whether the power has been reduced by too great an amount and to increase the power accordingly. Minimum and maximum amounts of transmit power or gain may be set.

In one alternative embodiment, the second, fast downward move in the transmit power is initially performed only for one or a few frames, then the power level is returned to its previous level. The system then waits to determine whether the frame or frames transmitted at the lower level were successfully received by the mobile station. If so, the base station then completes the fast downward move by reducing power to the lower level for subsequent frames until a further frame erasure is detected. If the single frame transmitted at the lower level was not successfully received because the power level was too low, then the system does not complete the fast downward move. Rather, the system merely continues to decrease the transmit power levels only incrementally. By first transmitting only one or a few frames at the lower level, then waiting to determine whether that frame was successfully received, the system thereby effectively ensures that no two consecutive frames are transmitted below the minimum power level which could otherwise result in two consecutive frame erasures. This variation is particularly desirable to ensure that a predetermined minimum FER of, for example 1%, is maintained. Without this variation, in some circumstances, two or more consecutive frame erasures could occur perhaps resulting in an overall FER higher than desired.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

With reference to the remaining figures, exemplary embodiments of the invention will now be described. The exemplary embodiments will primarily be described with reference to the graphs and flowcharts of FIGS. 3A–3C and 5–7. As to the flowcharts, each block illustrated therein represents both the recited method step and an apparatus element for performing the method step. Herein, the apparatus element may be referred to as a means for, an element for, or a unit for performing the method step. Depending upon the implementation, each apparatus element, or portions thereof, may be configured in hardware, software, firmware or combinations thereof. It should be appreciated that not all components necessary for a complete implementation of a practical system are illustrated or described in detail. Rather, only those components necessary for a thorough understanding of the invention are illustrated and described.

Moreover, although the flowcharts of the figures represent both method steps and apparatus elements for performing the recited steps and thereby illustrate and support both method and apparatus implementations of the invention, a separate apparatus figure (FIG. 4) is provided illustrating a specific implementation of the invention directed to a CDMA cellular telephone system. FIG. 4 is described below and will be referred to occasionally during the descriptions of FIGS. 3A–3C and 5–7. It should be understood, however, that the invention can be implemented in a wide variety of other systems besides the CDMA cellular telephone system of FIG. 4.

Figure 1:
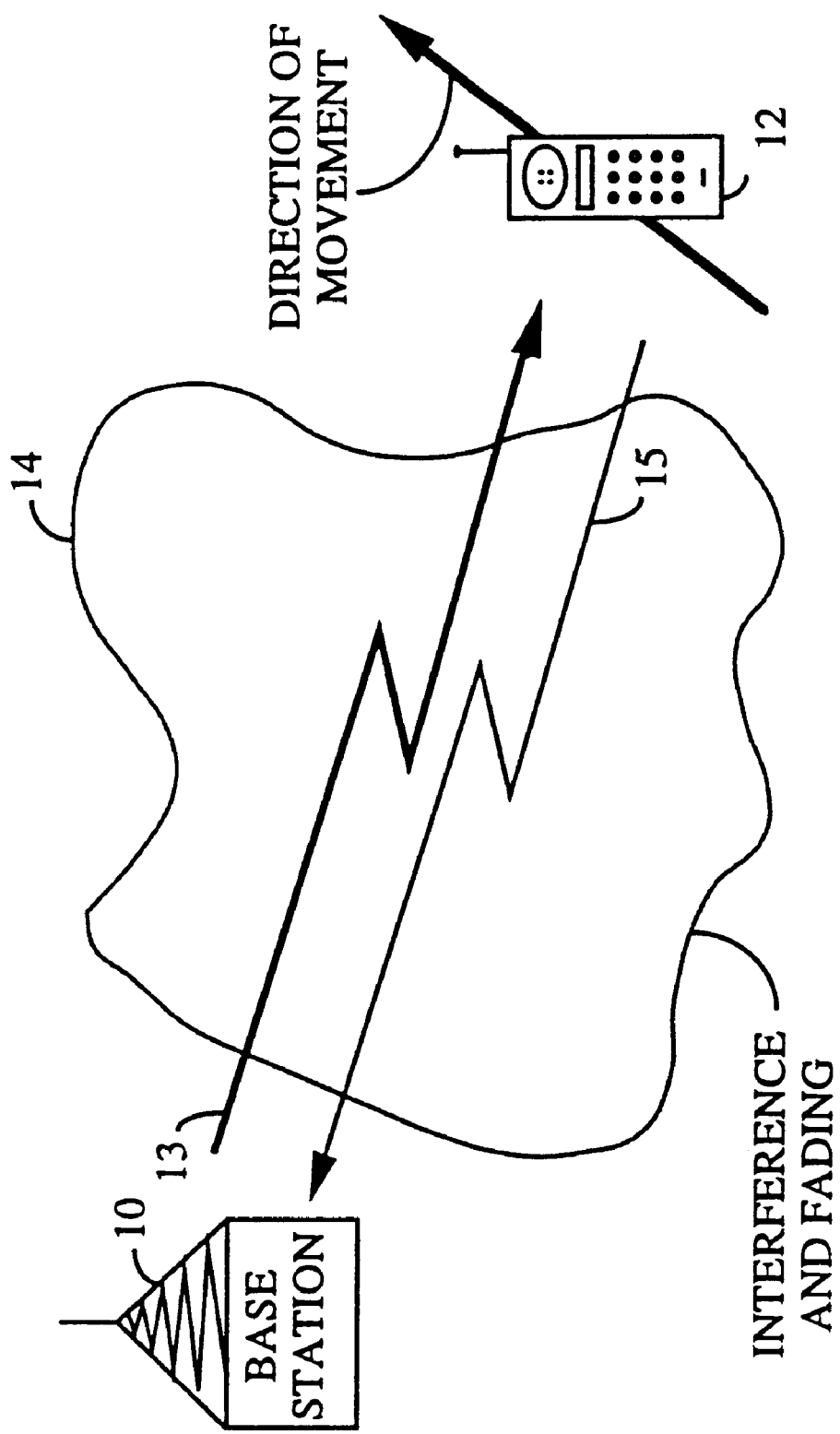
FIG. 1 is a diagram symbolically illustrating the forward link of a cellular telephone system.
Figure 3A:
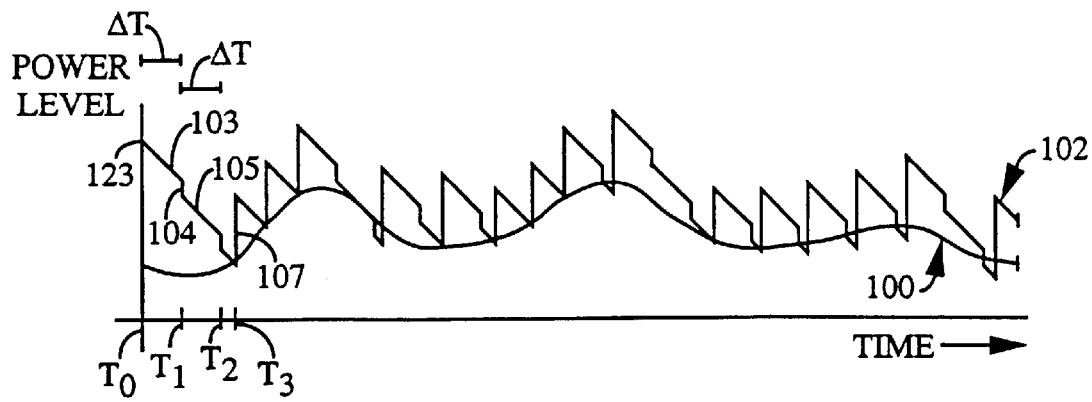
FIG. 3A is a graph illustrating an exemplary power transmission pattern resulting from applying a feedback control system configured in accordance with the invention to the exemplary minimum power transmission requirement curve of FIG. 2A, and in particular illustrating the fast downward move in transmit power provided by of the invention.
Figure 3B:
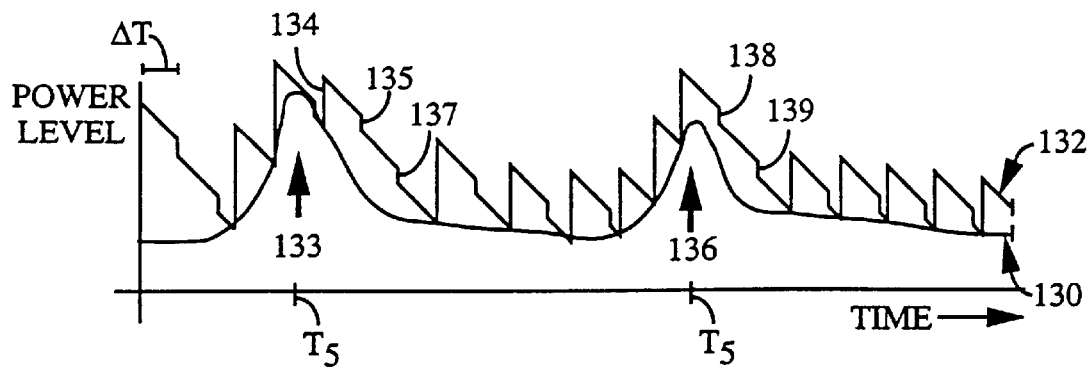
FIG. 3B is a graph illustrating an exemplary power transmission pattern resulting from applying the feedback control system of invention to the minimum power requirement curve of FIG. 2D and particularly illustrating the reduction in excess or surplus power transmitted in such a circumstance.
Figure 4:
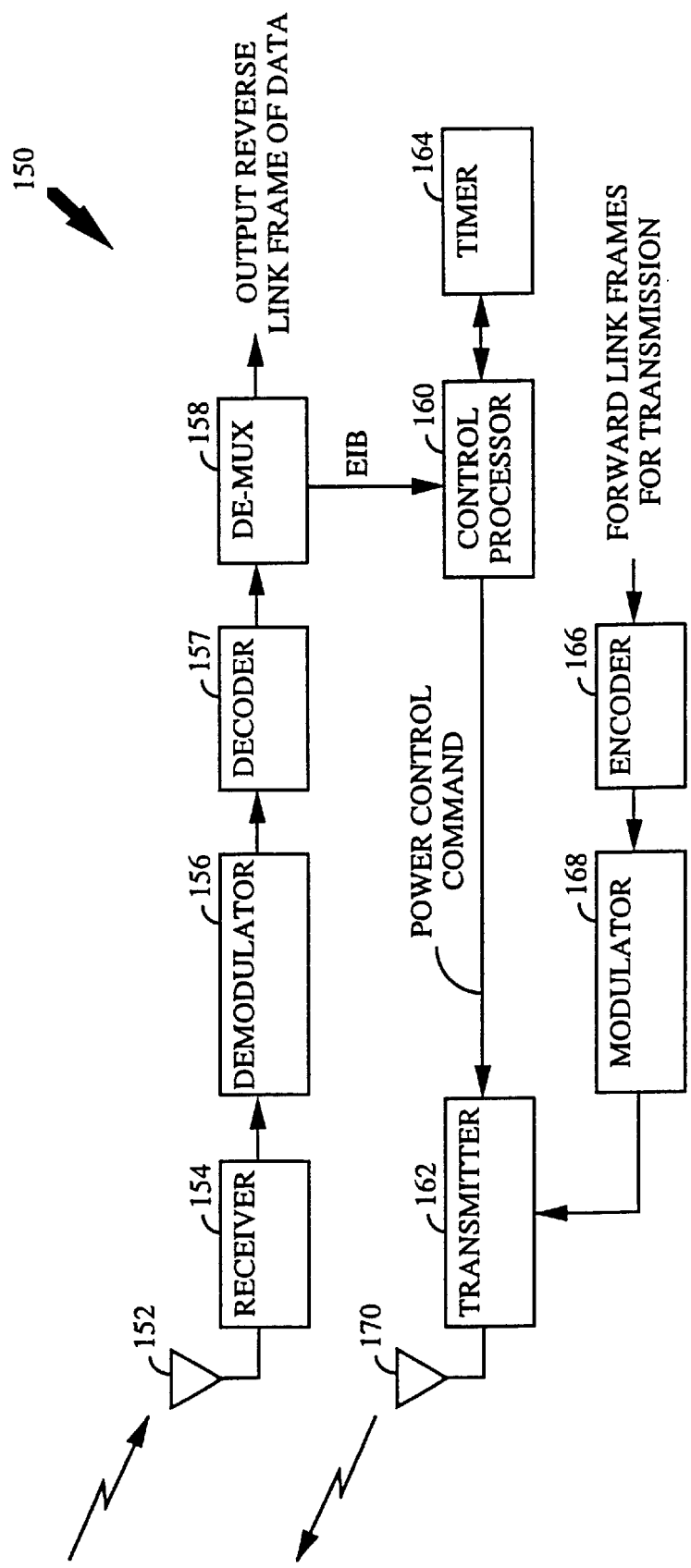
FIG. 4 is a block diagram illustrating a mobile telephone unit configured in accordance with CDMA techniques and implementing the power transmission feedback technique of FIGS. 3A–3C.

FIG. 3A illustrates the fast downward move technique of the invention. More specifically, FIG. 3A illustrates a minimum forward link power transmission requirement curve 100 as a function of time along with the actual transmitted forward link power curve 102 also as a function of time. Initially, at time $T_0$, base station 10 (FIG. 1) transmits signals in the form of frames (not individually shown in FIG. 3A) at an initial default power level 123. Thereafter, the power level is incrementally decreased 103 by slight amounts until a period of time $\Delta T(T_1-T_0)$ has elapsed, then the transmit power is significantly decreased by a more significant amount 104 to thereby achieve the fast downward move in transmit power. Then, beginning at time $T_1$, the transmit power level is again incrementally decreased 105 until either a second period of time $\Delta T$ has elapsed or until the transmit power falls below the minimum required transmit power resulting in one or more frame erasures. In the example of FIG. 3A, a second fast downward move occurs at time $T_2$ and frame erasure occurs at time $T_3$ triggering a sharp increase in the transmit power 107 intended to ensure that further frames are transmitted at a power level well above the corresponding minimum required power to thereby avoid too many additional frame erasures.

This process of incrementally decreasing the power until either the period of time $\Delta T$ has elapsed (after which a fast downward move is again performed) or until the transmit power falls below the minimum required power (after which a sharp increase in transmit power is performed) continues throughout the forward link transmission. By providing the fast downward move in transmit power as described, a lower average amount of transmitted power is typically achieved.

Figure 2A:
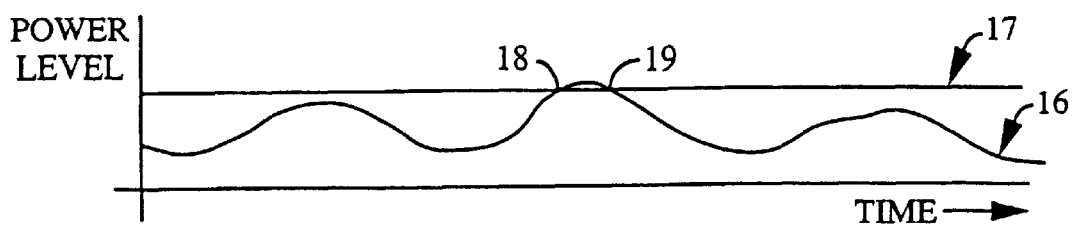
FIG. 2A is a graph illustrating an exemplary minimum power transmission requirement curve and a constant power transmission curve for the forward link of FIG. 1.
Figure 2B:
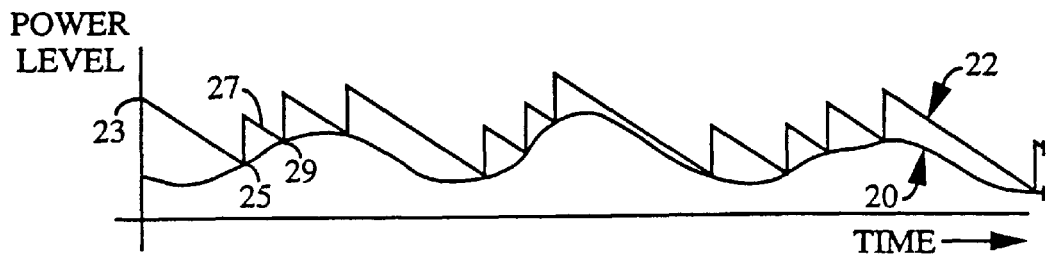
FIG. 2B is a graph illustrating an exemplary sawtooth power transmission pattern in relation to the minimum power transmission requirement curve of FIG. 2A.
Figure 2C:
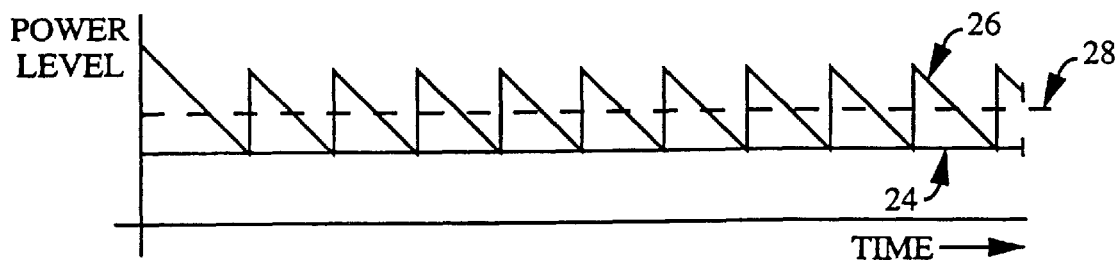
FIG. 2C is a graph illustrating an exemplary sawtooth power transmission pattern in relation to a flat minimum power requirement curve.
Figure 2D:
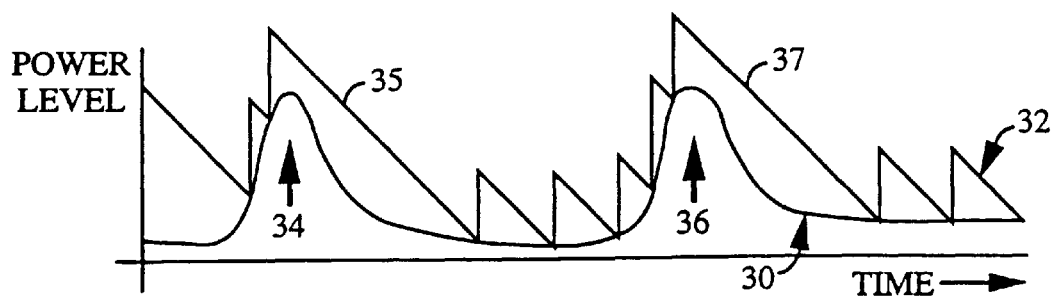
FIG. 2D is a graph illustrating an exemplary sawtooth power transmission pattern in relation to a minimum power requirement curve having occasional peaks of required power and particularly illustrating the excess or surplus power transmitted in such a circumstance.

The fast downward move is particularly effective in circumstances where the average minimum power requirements are relatively low but are interspersed with occasional peaks of higher required power. This is illustrated in FIG. 3C which shows a minimum required power curve 130 and an actual transmit power curve 132. As can be seen, a brief peak 133 in the minimum power requirement 130 occurs around time $T_4$, triggering an increase in transmit power 134. Thereafter, the transmit power is decreased quickly as a result of two consecutive fast downward moves 135 and 137 until a stable modified, sawtooth pattern is again achieved. A second brief peak 136 occurs around time $T_5$ followed by two fast downward moves 138 and 139. The pattern of FIG. 3C should be contrasted with the pattern of FIG. 2D wherein transmit power is decreased only incrementally resulting in relatively long periods of significantly excessive power following each peak in required power.

As noted, the techniques of the invention may be employed in many types of power reduction feedback systems but are particularly well suited for use in CDMA forward link power transmission systems. FIG. 4 illustrates a CDMA cellular base station 150 for transmitting signals to a mobile station such as the one shown in FIG. 1. Base station 150 includes an antenna 152 for receiving reverse link signals and for forwarding to a receiver 154 which down converts and amplifies the signal.

The signal is then provided to a demodulator 156 that demodulates the signal. In the exemplary embodiment, the demodulator is a CDMA demodulator as described in U.S. Pat. No. 4,901,307, referenced above. The use of CDMA techniques in a multiple access communication system is further disclosed in U.S. Pat. No. 5,103,459 also referenced above. The demodulated signal is provided to a decoder 157. In an exemplary implementation, the decoder is a multiple serial Viterbi decoder described in co-pending U.S. patent application Ser. No. 08/126,477 filed Sep. 24, 1993, assigned to the assignee of the present invention and incorporated by reference herein. Then signals are forwarded to a demultiplexer 158 that separates the EIB messages from the rest of each frame of the reverse link signal. The EIB message is provided to a control processor 160 which determines the transmission power level of a transmitter (TMTR) 162 in accordance with the EIB and a timer 164. Timer 164 keeps time in frames and is reset upon receipt of an EIB indicating proper reception of a forward link frame.

Forward link frames are provided to encoder 166 which encodes the frame for the purposes of error correction and detection as is well known in the art. The encoded frame is provided to a modulator 168 which in the exemplary embodiment is a CDMA modulator as described in the aforementioned U.S. Pat. Nos. 4,901,307 and 5,103,459. The modulated frame is provided to transmitter 162 which upconverts and amplifies the frame for transmission through antenna 170 which, depending upon the implementation, may be the same antenna as antenna 152.

Figure 5:
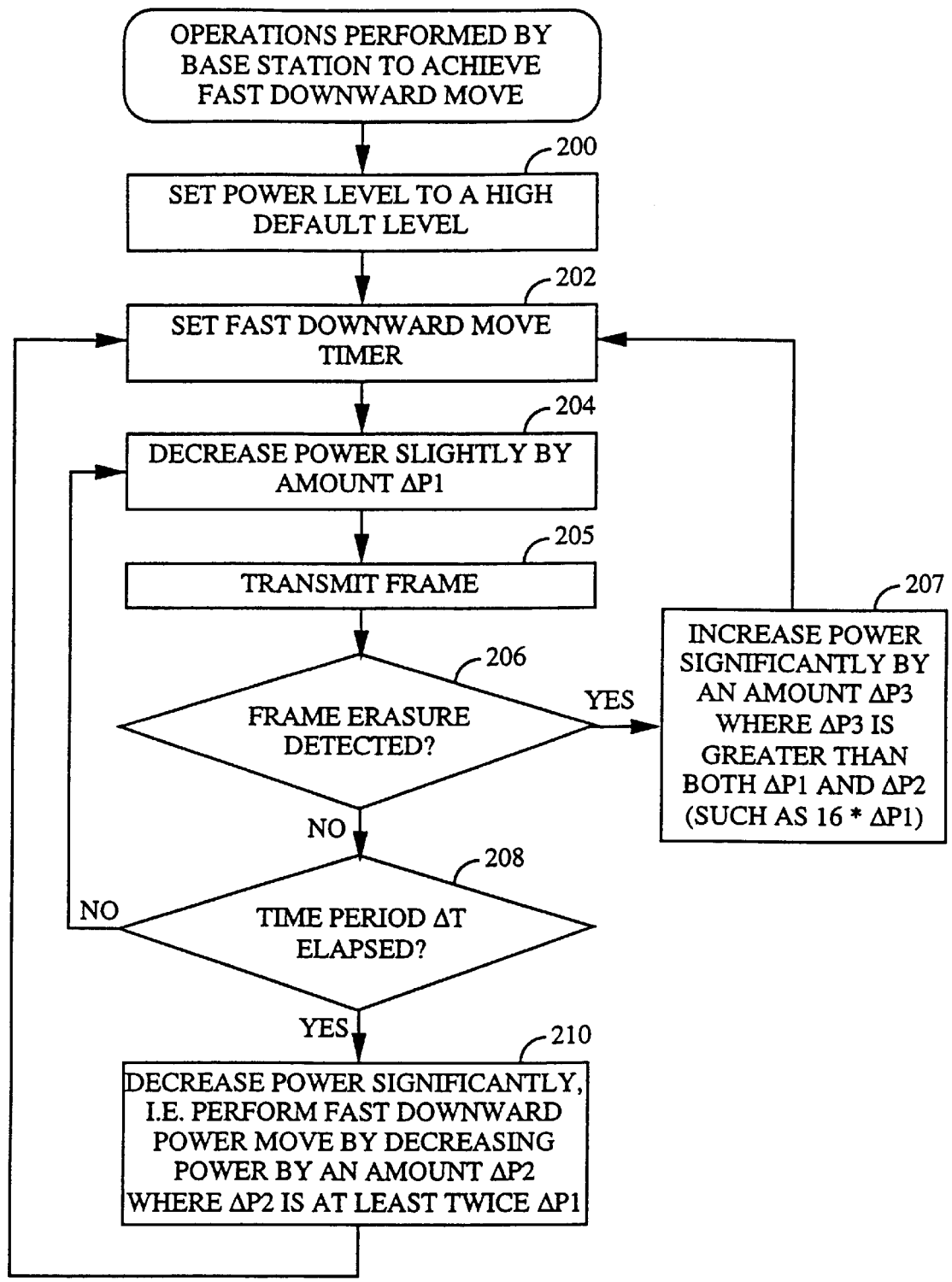
FIG. 5 is a flowchart illustrating a power control feedback system employing a fast downward move in accordance with a first exemplary embodiment of the invention.

The steps performed by base station 150 to execute the fast downward move are summarized by the flowchart of FIG. 5. Initially, at step 200, the base station transmits power at a high default level via TMTR 162 (FIG. 4). Thereafter, at step 202, timer 164 (FIG. 4) is activated. Then the signal transmission level is decreased slightly by control processor 160 (FIG. 4), step 204, and a frame is transmitted at step 205. For example, the power level may be decreased by an amount $\Delta P1$ per every ten frames where $\Delta P1$ is a small fraction of the transmit power. (Specific exemplary values are set forth below.) At step 206, control processor 160 (FIG. 4) of the base station determines whether a frame erasure was detected based upon an EIB received along the reverse link for a previously transmitted frame. If so, control processor 160 (FIG. 4) controls TMTR 162 (FIG. 4) to significantly increase the amount of power, step 207, resets the timer 202, then resumes incrementally decreasing the power level again at step 204. For example, the power level may be increased at step 207 by an amount $\Delta P3$ where $\Delta P3$ is sixteen times $\Delta P1$.

If, at step 206, no frame erasure was detected, then execution proceeds to step 208 where control processor 160 (FIG. 4) determines whether a time period $\Delta T$ has elapsed since the timer was activated at step 202. (Depending upon the implementation $\Delta T$ may be measured in frames.) If not, then execution again returns to step 204 where control processor 160 (FIG. 4) resumes incrementally decreasing the transmit power. If, however, the time period of $\Delta T$ has elapsed, then execution proceeds to step 210, wherein control processor 160 (FIG. 4) controls TMTR 162 (FIG. 4) to decrease the amount of transmit power significantly in accordance with the fast downward move. For example, the power may be decreased by an amount $\Delta P2$ where $\Delta P2$ is at least twice $\Delta P1$. Execution then returns to step 202 where timer 164 (FIG. 4) is reset before incremental power decreases are again initiated at step 204.

The amount of time $\Delta T$, as well as the various amounts of increase or decrease in power, may be set to any desired values. For practical cellular telephone applications employing IS-95-A protocols, it may be desirable to set the value of $\Delta T$ equal to the time required to transmit about 100 frames. The power increase following detection of a frame erasure and the subsequent incremental power decreases are preferably set to achieve a frame erasure rate of less than 1% for steady state conditions. Although FIG. 5 illustrates that a timer is set and compared against time $\Delta T$, other equivalent techniques may be performed. For example, the system may merely count the number of frames following each frame erasure and compare against a predetermined number of frames, such as 100 frames. Although not specifically show in FIG. 5 minimum and maximum transmit power levels may be set. If so, then any transmit power increases or reductions are subject to the maximum and minimum limits. Exemplary values of transmit power, in arbitrary units, are as follows:

| | |
|---|---|
| Maximum transmit power level: | 20 |
| Minimum transmit power level: | 100 |
| Power level increase following frame erasure: | 16 ($\Delta P3$) |
| Incremental power level decrease per every ten frames: | 1 ($\Delta P1$) |
| Power level decrease of fast downward move: | 2 ($\Delta P2$) |

Figure 6A:
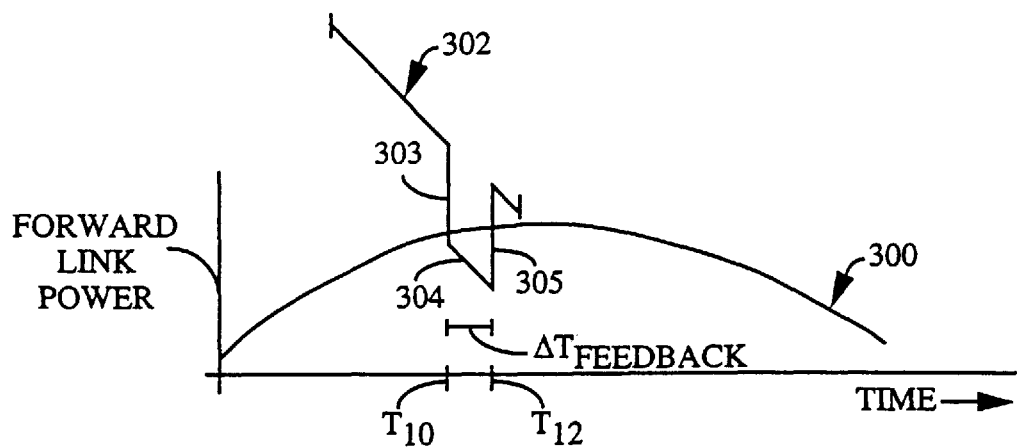
FIG. 6A is a graph illustrating consecutive frame erasures occurring in some circumstances as a result of the fast downward move of the invention.

In the foregoing, it was assumed that base station 150 (FIG. 4) can determine fairly promptly, by appropriate feedback signals, whether a transmitted frame is successfully received by the mobile station. Hence, the base station can increase the power level fairly promptly upon detection of a frame erasure. However, in practice, there is some feedback delay time between the transmission of a frame and receipt of a feedback signal on the reverse link indicating whether the frame was successfully received. During that period of time, the base station may transmit additional frames, each of which may be below the minimum required power resulting in a higher probability of additional consecutive frame erasures. This is illustrated in FIG. 6A. More specifically, FIG. 6A illustrates a minimum power requirement curve 300 and a transmit power curve 302, both as functions of time. At time $T_{10}$, a fast downward move 303 is performed resulting in transmission of frames at power levels 304 well below the minimum power requirements. The frames are therefore not successfully received. Moreover, a delay of $\Delta T_{FEEDBACK}$ occurs before the base station detects that frames transmitted immediately following time $T_{10}$ were not successfully received. Accordingly, it is not until time $T_{12}$ that the base station can determine that a sharp power increase 305 must be performed. Hence, all frames transmitted between time $T_{10}$ and $T_{12}$ could result in frame erasures. This may cause the overall FER to exceed a predetermined minimum acceptable FER, such as an FER of 1%.

To remedy this possible problem, an alternative fast downward move technique is provided wherein the fast downward move is performed only for a single frame, then the power level is temporarily increased until it can be determined whether the single frame transmitted at the lower power level was successfully received. If successfully received, then the power level is again reduced by the fast downward move amount and thereafter incrementally decreased until another frame erasure is detected. If the original frame transmitted at the lower power level resulted in a frame erasure, then the base station aborts the fast downward move and continues to merely incrementally decrease the power level from its pre-fast downward move level. By selecting the amount of the fast downward move as well as the feedback delay time, it can be assured that a predetermined minimum frame error rate is achieved. This alternative technique is illustrated by FIGS. 6B and 6C.

Figure 6B:
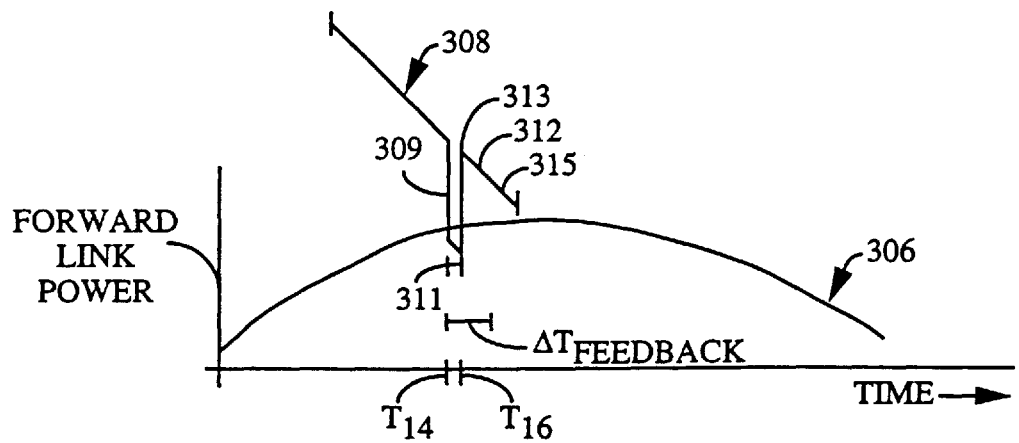
FIG. 6B is a graph illustrating an alternative technique wherein the forward link power is reduced for a single frame in accordance with a fast forward move until it can be determined whether the single frame transmitted at the lower power level was successfully received.

FIG. 6B illustrates a circumstance wherein the single frame transmitted at the lower power level is not successfully received. More specifically, FIG. 6B illustrates a minimum power requirement curve 306 and a transmit power curve 308, both as functions of time. At time $T_{14}$, a fast downward move 309 is performed resulting in transmission of one "probe" or test frame 311 below the corresponding minimum power requirement level 306. Subsequent frames are transmitted again starting at time $T_{16}$ initially at the pre-fast downward move power level 313. The power level is again incrementally decreased 312. A delay of $\Delta T_{FEED-BACK}$ occurs following time $T_{14}$ before the base station detects that the single probe frame transmitted at the lower power level resulted in a frame erasure. The base station does not complete the fast downward move and instead continues to merely incrementally decrease power 315 until a subsequent frame erasure occurs (not separately shown). As noted, during time 312 while the base station awaits a determination that the probe frame was successfully received, the transmit power is decreased incrementally. In other implementations, the power level is maintained at a constant level during time period 312 until the determination is made. Then either the fast downward move is completed or the incremental decrease in power is resumed.

Figure 6C:
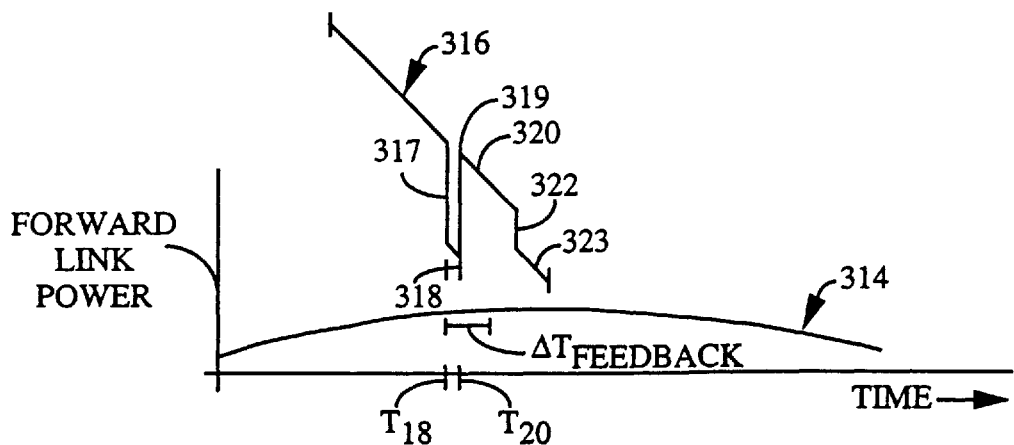
FIG. 6C is a graph illustrating the resulting transmit power levels in circumstances where the previously transmitted frame at the lower power level was successfully received.

FIG. 6C illustrates a circumstance wherein the single frame transmitted at the lower power level is successfully received. More specifically, FIG. 6C illustrates a minimum power requirement curve 314 and a transmit power curve 316. At time $T_{18}$, a fast downward move 317 is performed resulting in transmission of one frame 318 above the corresponding minimum power requirement level 314. Subsequent frames are transmitted again starting at time $T_{20}$ initially at the pre-fast downward move power level 319. The power level is again incrementally decreased 320. A delay of $\Delta T_{FEEDBACK}$ occurs following time $T_{18}$ before the base station detects that the single frame 318 transmitted at the lower power level did not result in a frame erasure. The base station completes the fast downward move 322 at time $T_{21}$ and thereafter continues to merely incrementally decrease power 323 until a subsequent frame erasure is detected (not separately shown).

Figure 7:
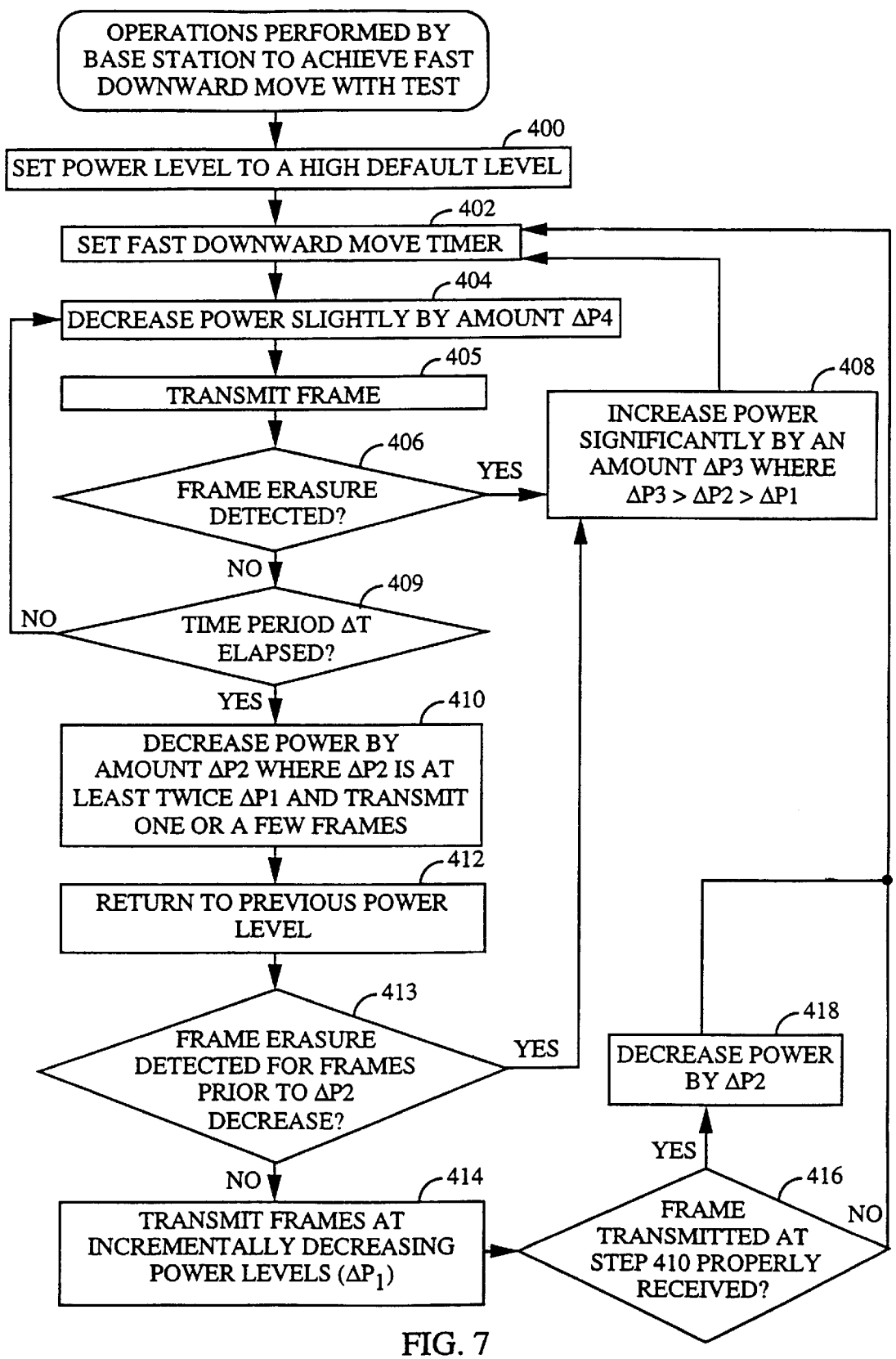
FIG. 7 is a flowchart illustrating a power transmission feedback system employing the technique of FIGS. 6A–6C wherein the forward link power control level is reduced for a single frame, then increased until it can be determined whether the frame transmitted at the lower level was successfully received.

This alternative technique is summarized by the flowchart of FIG. 7. Many of the steps of the flowchart of FIG. 7 are similar to or identical to steps of flowchart of FIG. 5. Only pertinent differences will be described in detail. Initially, at step 400, control processor 160 (FIG. 4) transmits power at a high default level. Thereafter, at step 402, timer 164 (FIG. 4) is set. Then the transmit power level is decreased slightly by control processor 160 (FIG. 4), step 404, and a frame is transmitted by TMTR 162 (FIG. 4) at step 405. As before, the power level may be decreased by an amount $\Delta P1$ per every ten frames where $\Delta P1$ is a small fraction of the transmit power. At step 406, control processor 160 (FIG. 4) determines whether a frame erasure was detected based upon a previously transmitted frame. If so, control processor 160 (FIG. 4) controls TMTR 162 (FIG. 4) to significantly increase the amount of power, step 408, resets the timer at step 402 then resumes incrementally decreasing the power level again at step 404. For example, the power level may be increased at step 408 by an amount $\Delta P3$ where $\Delta P3$ is sixteen times $\Delta P1$.

If at step 406, no frame erasure was detected, then execution proceeds to step 409 where control processor 160 (FIG. 4) determines whether a time period $\Delta T$ has elapsed since the timer was set at step 402. If not, then execution again returns to step 404 where control processor 160 (FIG. 4) resumes incrementally decreasing the transmit power of TMTR 162 (FIG. 4). If, however, the time period of $\Delta T$ has elapsed, then execution proceeds to step 410 where control processor 160 (FIG. 4) decreases the amount of transmit power of TMTR 162 (FIG. 4) significantly in accordance with the fast downward move. The power may be decreased by an amount $\Delta P2$ where $\Delta P2$ is at least twice $\Delta P1$.

Following execution of the fast downward move at 410, rather than immediately returning to step 402, base station 150 (FIG. 4) performs the steps beginning at 412. More specifically, at step 412, control processor 160 (FIG. 4) returns power level of TMTR 162 (FIG. 4) to the previous power transmission level used before the fast downward move. Then, at step 414, control processor 160 (FIG. 4) begins to incrementally decrease the power level until feedback is received for the frame transmitted at step 410, i.e. the power level is then again incrementally decreased by $\Delta P1$ if the feedback for frames sent before the one transmitted at the lower level indicate that they were correctly received. If any of the feedback for those frames sent before the one transmitted at the lower level indicates an erasure, the process goes to step 408 with a resulting increase in power and reset of the timer. Thereafter, at step 416, control processor 160 (FIG. 4) determines whether the previously transmitted frame resulted in a frame erasure. If so, execution merely returns to step 402 where subsequent transmissions occur at a higher power level. If no frame erasure had occurred, then the fast downward move is repeated by control processor 160 (FIG. 4), at step 418, and execution returns to step 402 for subsequent processing, i.e. the power is again reduced by an amount $\Delta P2$. In this manner, the fast downward move is "tested" to determine where a frame erasure occurs and, if such an erasure occurs, the fast downward move is aborted.

What has been described are various techniques for reducing the amount of transmit power in the forward link of a mobile transmission system, and in particular, in a CDMA system employing IS-95-A rate set 2 transmission protocols. However, principles of the invention may be implemented in any feedback control system where they are applicable.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A signal transmission power control system comprising:
   means for transmitting signals, said signals being transmitted initially at an initial transmit power level;
   means for successively and gradually decreasing said transmit power level by a first amount;
   means for receiving a signal indicating that said transmit power needs to be increased;
   means, responsive to receipt of said signal, for increasing said transmit power level followed immediately by another successive and gradual decrease of said transmit power level by an amount substantially equal to said first amount such that said transmit power level follows a generally saw-toothed pattern; and
   means for decreasing said transmit power level by a second amount, said second amount being greater than said first amount, following transmission of signals for a predetermined period of time without receipt of said signal indicating that said transmit power level needs to be increased.

2. The signal transmission power control system of claim 1
   wherein said means for transmitting signals operates to transmit said signals in frames; and
   wherein said signal indicating that said transmit power needs to be increased is a feedback signal indicating that a frame erasure occurred within a device receiving said frames.

3. The signal transmission power control system of claim 2 wherein said frames are part of a forward link of a mobile telephone transmission configured in accordance with IS-95-A rate set 2 protocols and wherein said feedback signal is an error indicator bit (EIB) contained within a frame of a reverse link transmission.

4. A cellular telephone forward link power control system comprising:
   means for transmitting frames, said frames being transmitted initially at an initial transmit power level;
   means for successively and gradually decreasing forward link transmit power levels by a first amount;
   means for receiving a signal indicating that a frame erasure occurred;
   means, responsive to receipt of said signal, for increasing said transmit power level followed immediately by another successive and gradual decrease of said transmit power level by an amount substantially equal to said first amount such that said transmit power level follows a generally saw-toothed pattern; and
   means for decreasing said forward link transmit power level by a second amount, greater than said first amount, following transmission of a predetermined number of consecutive frames without receipt of said signal indicating a frame erasure.

5. The cellular telephone forward link power control system of claim 4
   wherein said frames are configured in accordance with IS-95-A rate set 2 protocols and wherein said feedback signal is an error indicator bit (EIB) contained within a frame of a reverse link transmission.

6. A method for controlling power within a signal transmission system comprising the steps of:
   a) transmitting a signal at an initial power level;
   b) receiving a responsive signal indicating whether the transmitted signal was successfully received;
   c) if not successfully received, then transmitting a next signal at a power level that is significantly greater than a previous power level followed immediately by a successive and gradual decrease of said transmit power level such that said transmit power level follows a generally saw-toothed pattern; and
   d) if successfully received, then transmitting additional signals at successively, gradually lower power levels until a predetermined period of time has elapsed then transmitting a next signal at a power level that is significantly below the power level of a most recently transmitted signal.

7. The method of claim 6
   wherein said step of transmitting signals is performed to transmit said signals in frames; and
   wherein said signal indicating that said transmit power needs to be increased is a feedback signal indicating that a frame erasure occurred within a device receiving said frames.

8. The method of claim 7
   wherein said frames are part of a forward link of a mobile telephone transmission configured in accordance with IS-95-A rate set 2 protocols and wherein said feedback signal is an error indicator bit (EIB) contained within a frame of a reverse link transmission.

9. A signal transmission power control system comprising:
   means for transmitting signals, said signals being transmitted initially at an initial transmit power level;
   means for successively and incrementally decreasing said transmit power level by a first amount;
   means for receiving a signal indicating that said transmit power needs to be increased;
   means, responsive to receipt of said signal, for increasing said transmit power level; and
   means for decreasing said transmit power level by a second amount, said second amount being greater than said first amount, following transmission of signals for a predetermined period of time without receipt of said signal indicating that said transmit power level needs to be increased, wherein said means for decreasing said transmit power level by said second amount comprises:
   means for transmitting one or more probe signals at said decreased power level;
   means for determining whether said probe signals are successfully received by a receiving device; and
   means, operative in response to said determination, for decreasing said transmit power level for subsequent signals if said probe signals are successfully received by an amount which is greater than if said probe signals are not successfully received.

10. The signal transmission power control system of claim 9
    wherein said means for transmitting signals operates to transmit said signals in frames; and
    wherein said probe signals comprise one frame of signals.

11. A cellular telephone forward link power control system comprising:
    means for transmitting frames, said frames being transmitted initially at an initial transmit power level;
    means for successively and incrementally decreasing forward link transmit power levels by a first amount;

means for receiving a signal indicating that a frame erasure occurred;

means, responsive to receipt of said signal, for increasing said transmit power level; and means for decreasing said forward link transmit power level by a second amount, greater than said first amount, following transmission of a predetermined number of consecutive frames without receipt of said signal indicating a frame erasure, wherein said means for decreasing said forward link transmit power level by said second amount comprises:

means for transmitting a probe frame at said decreased power level;

means for determining whether said probe frame is successfully received by a receiving mobile station; and means, operative in response to said determination, for decreasing said transmit power level for subsequent frames if said probe frame is successfully received by an amount which is greater than if said probe frame is not successfully received.

12. A method for controlling power within a signal transmission system comprising the steps of:

a) transmitting a signal at an initial power level;

b) receiving a responsive signal indicating whether the transmitted signal was successfully received;

c) if not successfully received, then transmitting a next signal at a power level that is significantly greater than a previous power level; and d) if successfully received, then transmitting additional signals at successively, incrementally lower power levels until a predetermined period of time has elapsed then transmitting a next signal at a power level that is significantly below the power level of a most recently transmitted signal, wherein said step of transmitting said next signal at a power level that is significantly below the power level of a most recently transmitted signal comprises the steps of:

transmitting probe signals at said decreased power level;

determining whether said probe signals are successfully received by a receiving device; and decreasing said transmit power level for subsequent signals if said probe signals are successfully received by an amount which is greater than if said probe signals are not successfully received.

13. The method of claim 12 wherein said step of transmitting signals is performed to transmit said signals in frames; and wherein said probe signals comprise one frame of signals.

* * * * *